United States Patent
Gautam et al.

(10) Patent No.: US 11,171,837 B2
(45) Date of Patent: Nov. 9, 2021

(54) METHODS AND SYSTEMS FOR MANAGEMENT OF SHARED NETWORK SLICE INSTANCE (NSI) IN A WIRELESS NETWORK

(71) Applicant: SAMSUNG ELECTRONICS CO., LTD., Suwon-si (KR)

(72) Inventors: Deepanshu Gautam, Karnataka (IN); Rajavelsamy Rajadurai, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/929,629

(22) Filed: Jul. 15, 2020

(65) Prior Publication Data

US 2021/0021476 A1 Jan. 21, 2021

(30) Foreign Application Priority Data

Jul. 17, 2019 (IN) .............................. 201941028814
Feb. 20, 2020 (IN) .............................. 201941028814

(51) Int. Cl.
*H04L 12/24* (2006.01)
*H04W 24/02* (2009.01)
*H04W 28/16* (2009.01)

(52) U.S. Cl.
CPC ............ *H04L 41/12* (2013.01); *H04L 41/044* (2013.01); *H04L 41/0893* (2013.01);
(Continued)

(58) Field of Classification Search
CPC . H04L 41/0896; H04L 41/12; H04L 41/0806; H04L 41/0893; H04L 43/0817; H04L 41/044; H04W 28/16; H04W 24/02
See application file for complete search history.

(56) References Cited

U.S. PATENT DOCUMENTS 10,742,522 B2 * 8/2020 Senarath ............. H04L 41/5003
2018/0123878 A1 * 5/2018 Li ........................... H04L 47/70
(Continued)

FOREIGN PATENT DOCUMENTS

WO WO2019/029742 2/2019

OTHER PUBLICATIONS

"pCR 28.805 Solution for management aspects of NSI utilized by multiple communication services", S5-195837 Rel-16, Jun. 19-23, 2019, 2 pages.
(Continued)

*Primary Examiner* — Abdullahi E Salad
(74) *Attorney, Agent, or Firm* — Nixon & Vanderhye P.C.

(57) ABSTRACT

The present disclosure relates to a communication method and system for converging a 5th-generation (5G) communication system for supporting higher data rates beyond a 4th-generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein disclose a network management apparatus, method, and computer-readable storage medium for or management of shared NSI in a communication system.

20 Claims, 7 Drawing Sheets

(52) U.S. Cl.
CPC ......... *H04L 41/0896* (2013.01); *H04W 24/02* (2013.01); *H04W 28/16* (2013.01)

(56) References Cited

U.S. PATENT DOCUMENTS

| | | | | |
|---|---|---|---|---|
| 2018/0317134 | A1* | 11/2018 | Leroux | H04W 24/02 |
| 2019/0052579 | A1* | 2/2019 | Senarath | H04L 41/5048 |
| 2019/0223055 | A1* | 7/2019 | Bor Yaliniz | H04W 24/02 |
| 2019/0253907 | A1* | 8/2019 | Yao | H04W 16/02 |
| 2020/0037146 | A1* | 1/2020 | Salkintzis | H04W 8/02 |
| 2020/0059407 | A1* | 2/2020 | Lu | H04W 28/16 |
| 2020/0154292 | A1* | 5/2020 | Bor-Yaliniz | H04L 41/5025 |

OTHER PUBLICATIONS

European Search Report and Written Opinion dated Nov. 24, 2020 in corresponding European Application No. 20186298.4.
Huawei: "Clarification on UC of a CSI utilizing multiple NSis", 3GPP Draft; S5-194487 PCR 28.805 Clarification on UC of a CSI Utilizing Multiple NSIS, 3rd Generation Partnership Project (3GPP), Mobile Competence Centre; 650, Route Des Lucioles ; F-06921 Sophia-AN, vol. SA WG5, no. Sapporo, JP; 20190625-20190628 Jun. 27, 2019 (Jun. 27, 2019), XP051750073, Retrieved from the Internet: URL: http://www.3gpp.org/ftp/Meetings%5F3GP P%5FSYNC/SA5/Docs/S5%2D194487%2Ezip [retrieved on Jun. 27, 2019].
3rd Generation Partnership Project; Technical Specification Group Services and System Aspects; Telecommunication management; Study on management aspects of communication services (Release 16), 3GPP Standard; Technical Report; 3GPP TR 28.805, 3rd Generation Partnership Project (3GPP), Mobile Competence Centre; 650, Route Des Lucioles ; F-06921 Sophia-Antipolis Cedex ; France, No. V1.1.0, Jul. 10, 2019 (Jul. 10, 2019), pp. 1-32, XP051754661, [retrieved on Jul. 10, 2019] p. 19.
Samsung et al: "pCR 28.805 Solution for management aspects of NSI utilized by multiple communication services", 3GPP Draft; S5-195384 REL-16 PCR 28.805 Solution for Management Aspects of NSI Utilized by Multiple Communication Services, 3rd Generation Partnership Project (3GPP), Mobile Competence Centre; 650, R, vol. SA WG5, no. Bruges, Belgium; 20190619-20190623 Aug. 9, 2019 (Aug. 9, 2019), XP051755428, Retrieved from the Internet: URL:http://www.3gpp.org/ftp/tsg sa/WG5 TM/TSGS5 126/.

* cited by examiner

METHODS AND SYSTEMS FOR MANAGEMENT OF SHARED NETWORK SLICE INSTANCE (NSI) IN A WIRELESS NETWORK

CROSS-REFERENCE TO RELATED APPLICATIONS

This application is based on and claims priority under 35 U.S.C. § 119 to Indian Provisional Patent Application No. 201941028814, which was filed on Jul. 17, 2019, in the Indian Patent Office, and Indian Patent Application No. 201941028814, which was filed on Feb. 20, 2020, in the Indian Patent Office the disclosures of which are incorporated by reference herein in their entireties

BACKGROUND

Field

The disclosure relates to network slice management (NSM), and to an apparatus and a method for management of shared network slice instance (NSI) in a communication system.

Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE System." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered to be as an example of convergence between the 5G technology and the IoT technology.

In order to efficiently provide a network slice function and a communication service function, apparatus and methods for managing NSI shared by communication service instances (CSIs) in a communication system need to be provided.

SUMMARY

Embodiments of the disclosure provide methods for management of shared NSI in a wireless network.

Embodiments of the disclosure relate to determining, by a Communication Service Provider (CSP) that one of at least one active CSI and at least one prospective CSI shares a current NSI with a terminated CSI.

Embodiments of the disclosure relate to determining a level of scaling to be performed on the shared NSI as a consequence of terminating the terminated CSI.

Embodiments of the disclosure relate to determining whether the level of scaling meets a termination criteria.

Embodiments of the disclosure relate to allocating the at least one active CSI to another NSI and terminating the current NSI in response to determining that the level of scaling meets the termination criteria.

Embodiments of the disclosure relate to reserving another NSI for the prospective CSI and terminating the current NSI in response to determining that the level of scaling meets the termination criteria.

Embodiments of the disclosure relate to initiating modification procedures of the current NSI based on the level of scaling to be performed, in response to determining that the level of scaling does not meet the termination criteria.

Embodiments of the disclosure provide apparatus, methods, and a computer-readable storage medium for management of shared NSI in a communication system.

In accordance with an example embodiment of the disclosure, a network management apparatus for use in a telecommunications system is provided. The apparatus comprises processing circuitry configured to: receive a request signal requesting termination of a first communication service instance (CSI) supported by a first network slice instance (NSI) associated with a first set of network resource requirements; when at least one other CSI is currently supported by the first NSI along with the first CSI, determine a scaled-down set of network resource requirements associated with the first NSI when the first CSI is terminated; perform an analysis of the scaled-down set of network resource; based on the analysis, determine whether the first NSI should be terminated; and when the first NSI is to be terminated, initiate re-allocation of the at least one other CSI to a second existing NSI different from the first NSI.

In an example embodiment, the network management apparatus is configured for use in a core network of the telecommunications system.

In an example embodiment, the processing circuitry is configured to determine a status of the first CSI, and if the first CSI is in an active state, de-activate the first CSI.

In an example embodiment, the processing circuitry is configured to terminate the de-activated first CSI.

In an example embodiment, the processing circuitry is configured to determine whether at least one other CSI is currently supported by the first NSI.

In an example embodiment, the processing circuitry is configured to determine whether at least one other CSI is currently supported by the first NSI based on information received from management data analytics functionality (MDAF).

In an example embodiment, the processing circuitry is configured to perform an NSI modification feasibility analysis, and based on the NSI modification feasibility analysis, determine the scaled-down set of network resource requirements associated with the first NSI when the first CSI is terminated.

In an example embodiment, the processing circuitry is configured to perform the analysis of the scaled-down set of network resource requirements by comparing the scaled-down set of network resource requirements to a predetermined threshold, and based on the comparing, determine whether to modify the NSI or to terminate the first NSI.

In an example embodiment, when the first NSI is to be modified, the processing circuitry is configured to initiate one or more NSI modification procedures for the first NSI.

In an example embodiment, when the first NSI is to be terminated, the processing circuitry is configured to deactivate the at least one other CSI to detach the at least one other CSI from the first NSI before the at least one other CSI is re-allocated to the second existing NSI.

In an example embodiment, after deactivation of the at least one other CSI and detachment of the at least one other CSI from the first NSI, the processing circuitry is configured to initiate activation procedures for the at least one other CSI as part of re-allocating the at least one other CSI to the second existing NSI.

In an example embodiment, the processing circuitry is configured to terminate the first NSI when the at least one other CSI is re-allocated to the second existing NSI.

In an example embodiment, the processing circuitry is configured to perform a communication service management function (CSMF).

In an example embodiment, the processing circuitry is configured to perform one or more of a communication service management function (CSMF), a network slice management function (NMSF), or a network slice subnet management function (NMSSF) to reconfigure network resources to reduce resource consumption.

In accordance with an example embodiment of the disclosure, a method for network management in a core network of a telecommunications system is provided. The method comprises receiving a request signal requesting termination of a first communication service instance (CSI) supported by a first network slice instance (NSI) associated with a first set of network resource requirements; when at least one other CSI is currently supported by the first NSI along with the first CSI, determining a scaled-down set of network resource requirements associated with the first NSI when the first CSI is terminated; performing an analysis of the scaled-down set of network resource; based on the analysis, determining whether the first NSI should be terminated; and when the first NSI is to be terminated, initiating re-allocation of the at least one other CSI to a second existing NSI different from the first NSI.

In an example embodiment, the method further comprises determining a status of the first CSI, and if the first CSI is in an active state, de-activate the first CSI.

In an example embodiment, the method further comprises terminating the de-activated first CSI.

In an example embodiment, the method further comprises determining whether at least one other CSI is currently supported by the first NSI.

In an example embodiment, the method further comprises determining whether at least one other CSI is currently supported by the first NSI based on information received from management data analytics functionality (MDAF).

In an example embodiment, the method further comprises performing an NSI modification feasibility analysis, and based on the NSI modification feasibility analysis, determining the scaled-down set of network resource requirements associated with the first NSI when the first CSI is terminated.

In an example embodiment, the method further comprises performing the analysis of the scaled-down set of network resource requirements by comparing the scaled-down set of network resource requirements to a predetermined threshold, and based on the comparing, determine whether to modify the NSI or to terminate the first NSI.

In an example embodiment, when the first NSI is to be modified, the method further comprises initiating one or more NSI modification procedures for the first NSI.

In an example embodiment, when the first NSI is to be terminated, the method further comprises deactivating the at least one other CSI to detach the at least one other CSI from the first NSI before the at least one other CSI is re-allocated to the second existing NSI.

In an example embodiment, after deactivation of the at least one other CSI and detachment of the at least one other CSI from the first NSI, the method further comprises initiating activation procedures for the at least one other CSI as part of re-allocating the at least one other CSI to the second existing NSI.

In an example embodiment, the method further comprises terminating the first NSI when the at least one other CSI is re-allocated to the second existing NSI to reconfigure network resources to reduce resource consumption.

In accordance with an example embodiment of the disclosure, a non-transitory, computer-readable storage medium having computer-readable instructions stored thereon is provided. The computer-readable instructions are configured to, when executed, instruct one or more processors to: receive a request signal requesting termination of a first communication service instance (CSI) supported by a first network slice instance (NSI) associated with a first set of network resource requirements; when at least one other CSI is currently supported by the first NSI along with the first CSI, determine a scaled-down set of network resource requirements associated with the first NSI when the first CSI is terminated; perform an analysis of the scaled-down set of network resource; based on the analysis, determine whether the first NSI should be terminated; and when the first NSI is to be terminated, initiate re-allocation of the at least one other CSI to a second existing NSI different from the first NSI.

In an example embodiment, the computer-readable instructions, when executed, instruct one or more processors to determine a status of the first CSI, and if the first CSI is in an active state, de-activate the first CSI.

In an example embodiment, the computer-readable instructions, when executed, instruct one or more processors to terminate the de-activated first CSI.

In an example embodiment, the computer-readable instructions, when executed, instruct one or more processors to determine whether at least one other CSI is currently supported by the first NSI.

In an example embodiment, the computer-readable instructions, when executed, instruct one or more processors to determine whether at least one other CSI is currently supported by the first NSI based on information received from management data analytics functionality (MDAF).

In an example embodiment, the computer-readable instructions, when executed, instruct one or more processors to perform an NSI modification feasibility analysis, and based on the NSI modification feasibility analysis, determine the scaled-down set of network resource requirements associated with the first NSI when the first CSI is terminated.

In an example embodiment, the computer-readable instructions, when executed, instruct one or more processors to perform the analysis of the scaled-down set of network resource requirements by comparing the scaled-down set of network resource requirements to a predetermined threshold, and based on the comparing, determine whether to modify the NSI or to terminate the first NSI.

In an example embodiment, the computer-readable instructions, when executed, instruct one or more processors to, when the first NSI is to be modified, initiate one or more NSI modification procedures for the first NSI.

In an example embodiment, the computer-readable instructions, when executed, instruct one or more processors to, when the first NSI is to be terminated, deactivate the at least one other CSI to detach the at least one other CSI from the first NSI before the at least one other CSI is re-allocated to the second existing NSI.

In an example embodiment, the computer-readable instructions, when executed, instruct one or more processors to, after deactivation of the at least one other CSI and detachment of the at least one other CSI from the first NSI, initiate activation procedures for the at least one other CSI as part of re-allocating the at least one other CSI to the second existing NSI.

In an example embodiment, the computer-readable instructions, when executed, instruct one or more processors to terminate the first NSI when the at least one other CSI is re-allocated to the second existing NSI.

Accordingly, various further example embodiments herein disclose a method, system, and computer-readable storage medium for management of shared NSI in a wireless network. One method according to an example embodiment comprises terminating, by a Communication Service Provider (CSP), a Communication Service Instance (CSI) based on a termination request received from a Communication Service Customer (CSC). The terminated CSI was using a current NSI. The method further includes determining, by the CSP, that at least one active CSI and/or at least one prospective CSI shares the current NSI with the terminated CSI. The method further includes determining, by the CSP, a level of scaling to be performed on the shared NSI as a consequence of terminating the CSI. The method further includes determining, by the CSP, whether the level of scaling meets a termination criteria. The method includes allocating one of the at least one active CSI to another NSI and terminating the current NSI in response to determining that the level of scaling meets the termination criteria. In another embodiment, the method includes reserving another NSI for the at least one prospective CSI, and terminating the current NSI in response to determining that the level of scaling meets the termination criteria.

In an example embodiment, the method includes initiating modification procedures of the current NSI based on the level of scaling to be performed, in response to determining that the level of scaling does not meets the termination criteria.

In an example embodiment, allocating the at least active CSI to another NSI comprises de-activating, by the CSP, the at least one active CSI from the current NSI, and initiating, by the CSP, a activation procedure to allocate new NSI to the at least one active CSI.

In an example embodiment, terminating, by the CSP, the CSI comprises receiving, by the CSP, the termination request for terminating the CSI, from a CSC, and determining by the CSP, whether the CSI is in active state. The terminating further includes de-activing and terminating the CSI, in response to determining that the first CSI is in active state. In another embodiment, the terminating includes terminating the CSI, in response to determining that the first CSI is not in active state.

In an example embodiment, determining, by the CSP, that at least one prospective CSI shares the current NSI with the terminated CSI comprises sending, by the CSP, a query to at least one analytical function in the wireless network asking whether the at least one prospective CSI shares the current NSI with the terminated CSI, and receiving, by the CSP, a response to the query indicating that the at least one prospective CSI shares the current NSI with the terminated CSI. In an example embodiment, the at least one analytical function comprises a network data analytics functionality (NWDAF) and a management data analytics functionality (MDAF).

In an example embodiment, the at least one active CSI is at least one of current communication services utilizing the current NSI.

In an example embodiment, the at least one prospective CSI is at least one of prospective communication service which may utilize the current NSI in future.

In an example embodiment, the current NSI is terminated using one of a network slice management function (NSMF) and a network slice subnet management function (NSSMF) through a resource facing interface of a communication service management function (CSMF).

Example embodiments herein provide a wireless system for management of NSI. The wireless system comprises the CSP, the CSC, a plurality of NSI, and a plurality of CSI. The CSP is configured to terminate a CSI based on a termination request received, wherein the CSI uses a current NSI from the plurality of NSI. The CSP is further configured to determine that at least one active CSI and/or at least one prospective CSI shares the current NSI with the terminated CSI. The CSP is configured to determine a level of scaling to be performed as a consequence of the terminated CSI and the shared current NSI. Further the CSP is configured to determine whether the level of scaling meets a termination criteria. In an example embodiment, the CSP allocate the at least one active CSI to another NSI and terminate the current NSI in response to determining that the level of scaling meets the termination criteria. In an example embodiment, the CSP reserves another NSI for the prospective CSI and terminate the current NSI in response to determining that the level of scaling meets the termination criteria.

In an example embodiment, the CSP initiates modification procedures of the current NSI based on the level of scaling to be performed, in response to determining that the level of scaling does not meets the termination criteria.

It should be understood that in the following descriptions, while indicating various example embodiments and certain details thereof, the example embodiments are provided by way of illustration and not of limitation. Many changes and modifications may be made within the scope of the disclosure without departing from the spirit thereof, and the example embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
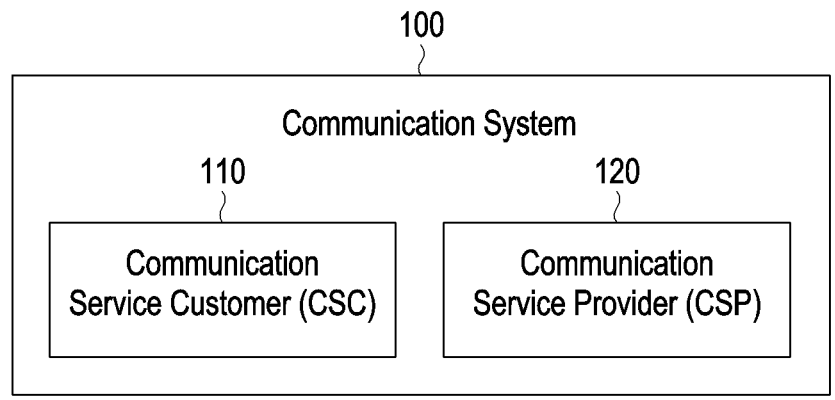
FIG. 1 is a block diagram illustrating an example communication system, according to an embodiment of the present disclosure.

The example embodiments herein and the various features and advantageous details thereof are explained with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, example embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the example embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Further, before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

The present disclosure relates to apparatus and methods for management of shared NSI in a communication system (network). The communication system may be a communication system using 5G, long term evolution (LTE), LTE advanced (LTE-A), high speed packet access (HSPA), Wi-Fi and/or other wire/wireless communication techniques, and each entity in the communication system may communicate with each other using one or more of the communication techniques.

Hereinafter, for the sake of convenience, example embodiments of the present disclosure will be described based on definitions and terms used for a 3GPP communication system including a 3GPP 5G system (or a 3GPP legacy system) and 3GPP management system to support a management of the 3GPP 5G system, as below.

5G System: a 3GPP system including a 5G Access Network (AN), a 5G Core Network, and one or more UEs.

Network Function: a 3GPP adopted or 3GPP defined processing function in a network, which has defined functional behaviour and 3GPP defined interfaces. (A network function can be implemented either as a network element on dedicated hardware, as a software instance running on dedicated hardware, or as a virtualised function instantiated on an appropriate platform, e.g., on a cloud infrastructure.)

Network Slice: A logical network that provides specific network capabilities and network characteristics.

Network Slice instance: A set of Network Function instances and required resources (e.g. compute, storage and networking resources) which form a deployed Network Slice.

Network slice subnet: a representation of the management aspects of a set of Managed Functions and the required resources (e.g. compute, storage and networking resources).

Network slice subnet instance: an instance of Network Slice Subnet representing the management aspects of a set of Managed Function instances and the used resources (e.g., compute, storage and networking resources).

Communication services: subset of 3GPP defined services. Examples of 3GPP services (e.g., 5G LAN) can be found in TS 22.261.

Communication service instance: run-time construct of a communication service for a defined group of users However, it will be apparent to those skilled in the art that the present disclosure is not limited by the above the definitions and terms, and may be applicable to other communication systems performing the same or similar functions as the 3GPP communication system.

3GPP TS 28.530 and 28.531 defines the management of network slice in 5G networks. Communication services are provided using one or multiple network slices. A network slice instance (NSI) may support multiple communication service instances (CSI). Similarly, a CSI may utilize multiple NSIs. A study item on the management aspect of communication services is undergoing in 3GPP SA5 (TR 28.805—a study on management aspects of communication services) which is studying the provisions of management of CSI(s) running on top of NSI(s). A specific use case in the study is about the management of NSI being used by multiple CSIs.

A problem lies in handling the request of a CSI termination, which leads to the respective NSI termination being used by multiple CSIs. TS 28.531 defines the mechanism of terminating an NSI if it is no longer required. The mechanism says that if the network slice management function (NSMF), due to any reason, decides not to terminate the NSI, it should modify (e.g., scale-in/down) the NSI instead. With this mechanism, it might be possible that the network will have many small NSIs to be managed by a single NSMF. This is not efficient for the NSMF implementations, as NSMF have to do the orchestration and management (lifecycle management, Performance Assurance, Fault Supervision) of each of the small NSIs separately, causing a probable bottleneck for NSMF functionality. Another problem is that the CSI re-allocation procedures are not defined.

Meanwhile, a single NSI can be assigned to multiple CSIs. In this case, if a particular CSI is no longer required, a communication service customer (CSC) sends the CSI termination request to the communication service provider (CSP). The CSP deactivates the CSI, if it is active, and then terminates the CSI. The CSP sends a NSI termination request to NSMF, if it is possible. If it is not possible (e.g., since there could be other CSIs using the NSI), the CSP decides to modify (e.g., scale-in/down) the NSI instead, by sending a NSI modification request to NSMF. The scale-in/down is done in proportion to the requirements imposed by the CSI being terminated.

Example embodiments disclose a method for management of shared NSI in a communication system (network). The method comprises terminating, by a Communication Service Provider (CSP), a Communication Service Instance (CSI) based on a termination request received from a Communication Service Customer (CSC). The terminated CSI was using a current NSI. The method further includes determining, by the CSP, that one of at least one active CSI and at least one prospective CSI shares the current NSI with the terminated CSI. The method further includes determining, by the CSP, a level of scaling to be performed on the shared NSI as a consequence of the terminated CSI and the shared current NSI. The method further includes determining, by the CSP, whether the level of scaling meets a termination criteria.

After determining the method includes allocating the at least one active CSI to another NSI and terminating the current NSI in response to determining that the level of scaling meets the termination criteria. In another embodiment, the method includes reserving another NSI for the prospective CSI and terminating the current NSI in response to determining that the level of scaling meets the termination criteria.

In an example embodiment, the method includes initiating modification procedures of the current NSI based on the level of scaling to be performed, in response to determining that the level of scaling does not meets the termination criteria.

Unlike conventional methods, the method makes NSI management more efficient when the NSI is being shared by multiple CSI and reduces the number of NSIs to be managed by single NSMF.

Referring now to the drawings, and more particularly to FIG. 1-FIG. 4, where similar reference characters denote corresponding features consistently throughout the figures, there are shown example embodiments.

FIG. 1 is a block diagram of a communication system 100, according to example embodiments. In an example embodiment, the communication system 100 includes a CSC 110 and a CSP 120 that communicate with each other.

In an example embodiment, the communication system 100 further includes at least one management function, such as NSMF, NSSMF and a CSMF, or at least one network entity performing at least one management function, such as a network entity performing the NSMF, a network entity performing the NSSMF and a network entity performing the CSMF. In an example embodiment, the CSP performs the at least one management function. For example, the CSMF, NSMF and NSSMF are included in the CSP. In another example embodiment, the CSP and a network operator (NOP) perform the at least one management function. For example, the CSMF is included in the CSP and the NSMF and NSSMF are included in the NOP. The communication system 100 also comprises a plurality of NSI and a plurality of CSI.

In an example embodiment, the CSP 120 receives a CSI termination request from the CSC 110 and terminates the CSI based on the termination request. For example, the CSP 120 may terminate the CSI via the CSMF. In an example embodiment, the CSP 120 determines whether the CSI is in active state or de-active state. If the CSP 120 determines that the CSI is in active state, then it de-activates and then terminates the CSI, or then it directly terminates the CSI.

Further, the current NSI which is used by the terminated CSI also needs to be terminated. However, the CSP 120 determines that the current NSI is also used by at least one of another active CSI(s) and prospective CSI(s). In an example embodiment, the active CSI is one of current communication services (or CSIs) utilizing the current NSI. In the present disclosure, the active CSI may be referred to the current CSI. In another example embodiment, the prospective CSI is one of prospective communication services (or CSIs) which will utilize the current NSI. For example, the prospective CSI may be a CSI that will use the current NSI in the future.

In an example embodiment, the CSP 120 sends a query to analytical functions asking the information about the current NSI being shared by prospective CSI(s). For example, the analytical function comprises a network data analytics functionality (NWDAF) and/or a management data analytics functionality (MDAF). The analytical function(s), after receiving the query, provides a response to the query indicating (including) the list of prospective CSI(s) sharing the current NSI. In an example embodiment, the analytical function may provide the response to the query based on: the availability of active resource reservations against the current NSI, historically alike CSI(s) instantiation records, and the like.

In another example embodiment, the CSP 120 sends a query to a CSI inventory present in the communication system 100 asking for information about the current NSI being shared by current CSIs. The inventory sends a response to the CSP 120 indicating (including) the list of current CSIs sharing the current NSI.

In an example embodiment, after determining that the current NSI is also used by at least one of another active CSI(s) and prospective CSI(s), the CSP 120 determines/identifies a level of scaling (e.g., scale-in/down) to be performed on the current NSI. For example, the CSP 120 may perform, via the CSMF and the NSMF, a modification feasibility check to identify the level of scaling to be performed on the current NSI.

The CSP 120 further determines whether the level of scaling meets a termination criteria. For example, the CSP 120 may determine, via the NSMF, whether the level of scaling meets a termination criteria based on the modification feasibility check.

In an example embodiment, if the level of scaling meets the termination criteria, then the current CSI is de-activated by the CSP 120 and are allocated to new NSI. After allocation of the new NSI, the current NSI is terminated by the CSP 120. The allocation of new NSI to the current CSI(s) and the prospective CSI(s) includes initiating an activation procedure.

In an example embodiment, if the level of scaling meets the termination criteria, then another NSI is reserved for the prospective CSI and the current NSI is terminated.

In an example embodiment, the current NSI is terminated using one of the NSFM and NSSFM through a resource facing interface of a CSMF.

Further, in an example embodiment, if the level of scaling does not meet the termination criteria, then the CSP 120 initiates a modification procedure of the current NSI based on the level of scaling to be performed. The modification procedure may be performed, for example, as defined in clause 7.6 of 3GPP TS 28.531.

According to the clause 7.6 of 3GPP TS 28.531, based on the NSI modification request from a Network Slice Management Service Consumer (NSMS_C) (e.g., CSP or CSMF), a Network Slice Management Service Provider (NSMS_P) (e.g. NSMF) invokes the feasibility check procedure to check if the modification requirements can be satisfied. The NSMS_P then decomposes the NSI modification request into multiple NSSI modification requests. The NSMS_P then invokes NSSI modification for each identified NSSI. As part of NSSI modification procedures, the NSSI, as a virtualized network function (VNF), is scaled as per the provisions defined in ETSI Industry Specification Group for Network Functions Virtualizati on (ISO NFV). After each NSSI is scaled successfully, NSMS_P send the NSI modification result to the NSMS_C.

Although the FIG. 1 shows various components of the communication system 100, it is understood that other embodiments are not limited thereto. In other embodiments, the communication system 100 may include less or more components. Further, the labels or names of the components are used only for illustrative purpose and are not limiting.

Figure 2:
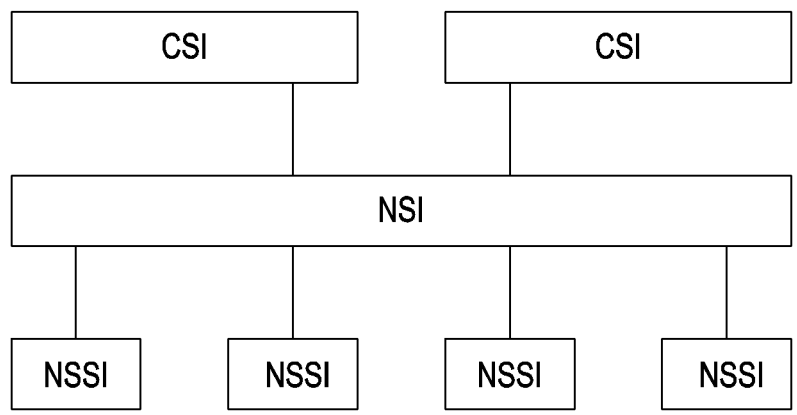
FIG. 2 is a block diagram illustrating an example 5G deployment hierarchy comprising NSI, CSI and Network Slice Subnet Instance (NSSI), according to the embodiments of the present disclosure.

FIG. 2 is a block diagram indicating a 5G NSI/CSI deployment hierarchy. As seen in FIG. 2, plurality of CSIs (e.g., two CSIs) may use the same NSI. In other words, the same NSI may be shared by the plurality of CSIs or the plurality of CSIs may be supported by the same NSI. Further, the NSI is connected/associated with a plurality of NSSIs. So, in an example embodiment, when the CSP 120 receives a CSI termination request from the CSC, the CSP terminates the CSI. However, the current NSI used by the terminated CSI cannot be terminated immediately because another CSI is using the current NSI. The present example embodiment makes the current NSI management more efficient when the NSI is being shared by multiple CSIs by reducing the number of NSIs to be managed by a single NSMF.

Figure 3:
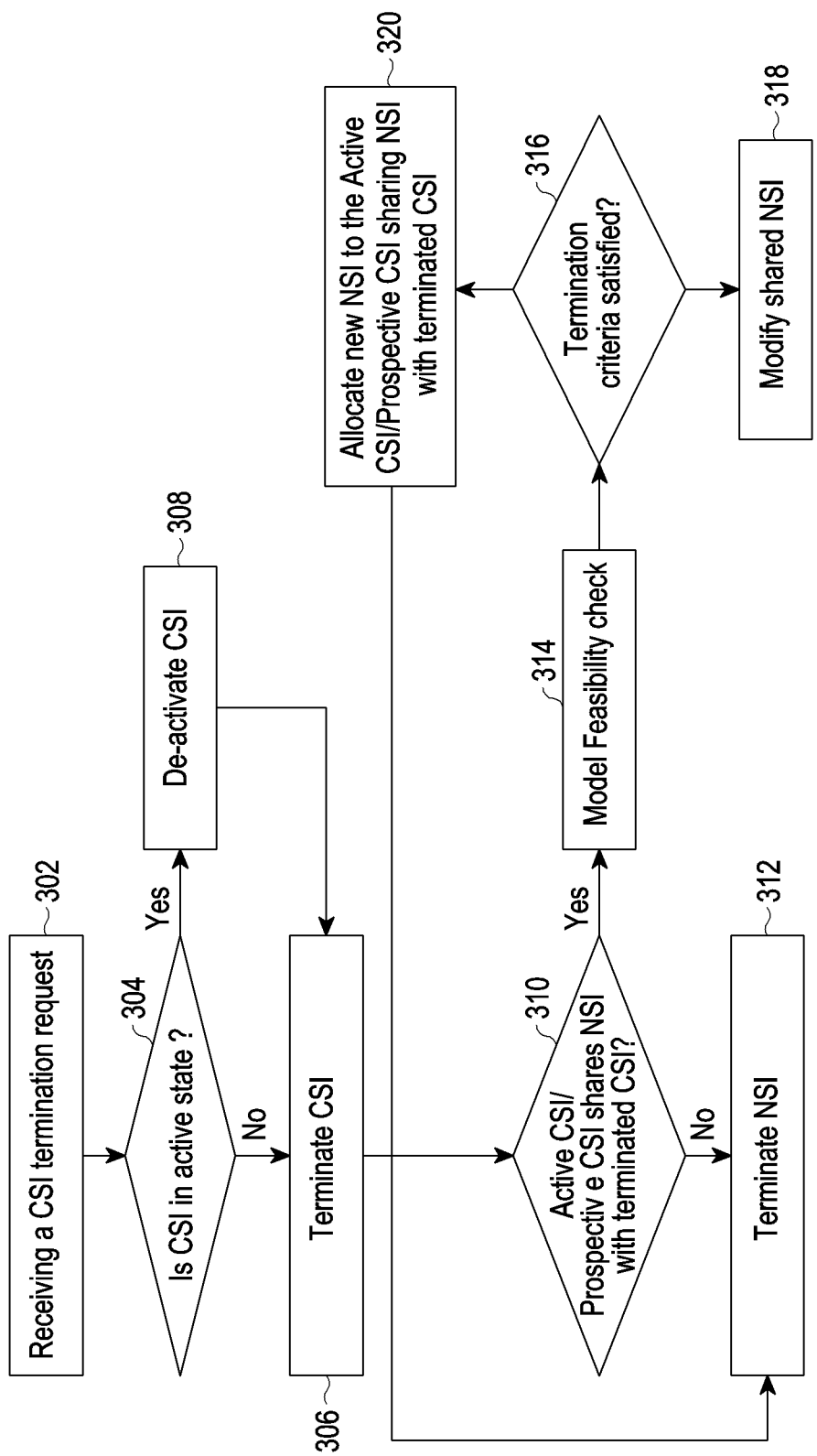
FIG. 3 is a flowchart illustrating example operations for management of NSI, according to the embodiments of the present disclosure.

FIG. 3 is a flow diagram illustrating example procedures for management of an NSI according to example embodiments. As seen in FIG. 3, at 302, the CSP 120 receives a CSI termination request from the CSC 110. At 304, the CSP 120 determines whether the CSI to be terminated is in an active state. If the CSI is in an active state, then the CSP 120 de-activates the CSI at 308 and then terminates the CSI at

306. However, if the CSP 120 determines that the CSI is not in an active state, then the CSP 120 directly terminates the CSI at 306.

At 310, the CSP 120 determines that the terminated CSI was using the current NSI and whether any other active CSI(s) and/or any other prospective CSI(s) is using or will be using the current CSI. For example, the CSP 120 may determine whether at least one of the active/current CSI(s) and the prospective CSI(s) shares the current NSI with the terminated CSI.

In an example embodiment, the CSP 120 sends a query to analytical function(s) asking for information about the current NSI being shared by prospective CSI(s). The analytical function comprises a network data analytics functionality (NWDAF) and a management data analytics functionality (MDAF). The analytical function(s), after receiving the query, provides a response to the query indicating (including) the list of prospective CSI(s) sharing the current NSI. In an example embodiment, the analytical function may provide the response to the query based on: the availability of active resource reservations against the current NSI, historically alike CSI(s) instantiation records, and the like.

In another example embodiment, CSP 120 sends a query to a CSI inventory in the communication system 100 asking for information about the current NSI being shared by current CSI(s). The inventory sends a response to the CSP 120 indicating (including) the list of current CSI(s) sharing the current NSI.

If it is determined that there are no active CSI(s) and prospective CSI(s) using the current NSI, then the CSP 120 immediately terminates the NSI at step 312.

In an example embodiment, the active CSI(s) is at least one of current communication service(s) utilizing the current NSI. In another example embodiment, a prospective CSI(s) is at least one of prospective communication service(s) which will utilize the current NSI. For example, the prospective CSI may be a CSI that will use the current NSI in the future.

In another example embodiment, if it is determined that at least one of the current/active CSI(s) and the prospective CSI(s) is using the current NSI, then the method proceeds to 314.

At 314, a model feasibility check (modification feasibility check) is performed. In an example embodiment, the model/modification feasibility check may be performed by the CSP 120 via the CSMF and the NSMF. The model/modification feasibility check may be used to determine/identify the level of scaling to be performed on the current NSI shared by the terminated CSI and at least one of the current CSI(s) and the prospective CSI(s), and then, the method proceeds to 316.

At 316, the method checks whether a termination criteria is satisfied. The termination criteria determines whether the level of scaling is more than a threshold criteria (e.g., a predefined threshold (modTh)). In an example embodiment, if the termination criteria is met that the level of scaling is greater than the threshold (e.g., 70% virtual resource reduction at a percentage), then the method proceeds to 320. At 320, the CSP 120 allocates new NSI to the active CSI, and the current NSI is terminated at step 312. In another example embodiment, at 320, the CSP 120 reserves another NSI for the prospective CSI. Then the current NSI is terminated at step 312.

In an example embodiment, if the termination criteria is not met that the level of scaling is less than the threshold, then the method proceeds to 318. At 318, the method initiates a modification procedure of the current shared NSI. The modification procedure of the current shared NSI is performed based on the level of scaling to be performed. In an example embodiment, the modification procedure may be performed as defined in clause 7.6 of 3GPP TS 28.531.

According to the clause 7.6 of 3GPP TS 28.531, based on the NSI modification request from the NSMS_C (e.g., a CSP or CSMF), the NSMS_P (e.g., NSMF) invokes the feasibility check procedure to check if the modification requirements can be satisfied. The NSMS_P then decomposes the NSI modification request into multiple NSSI modification requests. The NSMS_P then invokes an NSSI modification for each identified NSSI. As part of NSSI modification procedures, the NSSI, as a VNF, is scaled as per the provisions defined in ETSI NFV ISO. After each NSSI is scaled successfully, the NSMS_P sends the NSI modification result to NSMS_C.

In an example embodiment, the current NSI is terminated using at least one of a NSMF and a NSSMF through a resource facing interface of a CSMF.

Thus, the termination of NSI is efficiently handled by the process described above.

Figure 4A:
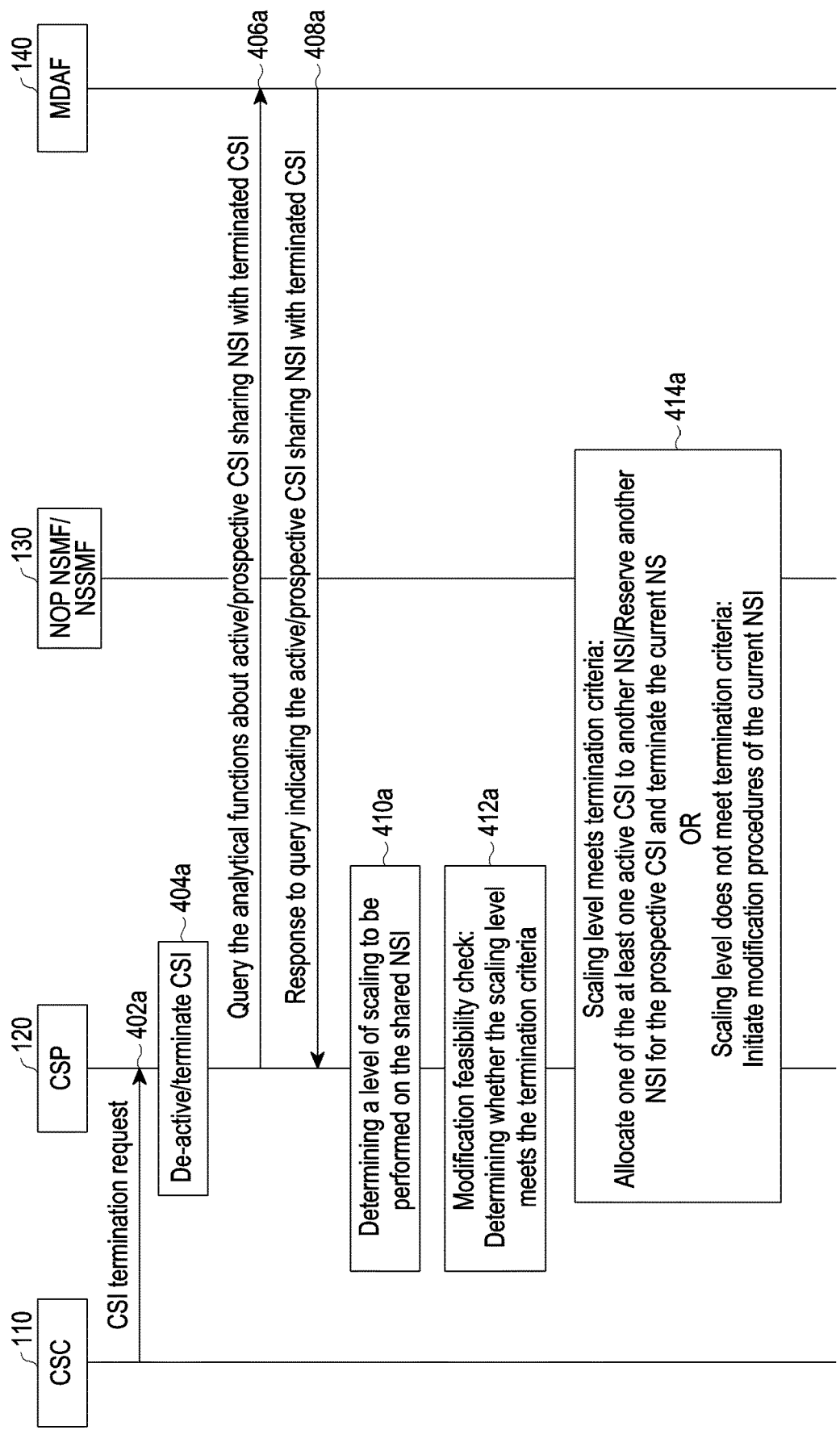
FIG. 4A is a signal flow diagram illustrating example operations for management of NSI, according to an embodiment of the present disclosure.

FIG. 4a is a sequence diagram illustrating a sequence for management of NSI, according to an example embodiment. As seen in FIG. 4a, the CSC 110, the CSP 120, the management functions NSMF/NSSFM 130, and the analytical functions MDAF 140 (or NWDAF) communicate with each other for management of the current NSI shared by the terminated CSI and at least one of current/active CSI(s) and prospective CSI(s).

At 402a, the CSC 100 sends a termination request (CSI termination request) to the CSP 120 for terminating a CSI. At 404a, the CSP 120 deactivates and terminates the CSI. At 406a, the CSP 120 sends a query (CSI query) to the at least one analytical function 140 to determine whether at least one of the active CSI(s) and the prospective CSI(s) uses the current NSI which was used by the terminated CSI (e.g., to determine whether at least one existing CSI shares the current NSI with the terminated CSI). At 408a, the CSP 120 receives a response from the analytical function 140 indicating (including) a list of prospective CSI(s) and/or active CSI(s) using the current NSI. In an example embodiment, the analytical function may provide the response to the query based on the availability of active resource reservations against the current NSI, historically alike CSI(s) instantiation records, and the like.

In another example embodiment, at 406a, the CSP 120 sends a query to a CSI inventory present in the communication system 100 asking for information about the current NSI being shared by current CSIs. The inventory sends a response to the CSP 120 indicating (including) the list of current CSIs sharing the current NSI.

At 410a, the method determines a level of scaling to be performed on the current NSI as a result of the terminated CSI and/or the active CSI(s) and the prospective CSI(s) using the current NSI.

At 412a, a model feasibility check (modification feasibility check) is performed. In an example embodiment, the model/modification feasibility check may be performed by the CSP 120 via the CSMF and the NSMF. In an example embodiment, the model/modification feasibility check may determine/identify whether a termination criteria is satisfied. The termination criteria may determine whether the level of scaling is more than a threshold criteria.

In an example embodiment, in the modification feasibility check procedure, the CSMF may determine a new set of resource requirements for the current NSI based on the termination of CSI and the requirements of the current/prospective CSI(s). For example, the CSMF may determine a new set of resource requirements for the current NSI based on the requirements of the terminated CSI and the requirements of the current/prospective CSI(s). In the modification feasibility check procedure, the CSMF may deliver the new set of resource requirements to NSMF. In the modification feasibility check procedure, the NSMF may determine a level of a scaling (e.g., scale-in/down) for the current NSI based on the new and existing set of resource requirements. For example, the NSMF may determine a level of a scaling (e.g., scale-in/down) for the current NSI in a cooperation with the NSSMF.

At 412a, the method checks whether a termination criteria is satisfied. The termination criteria determines whether the level of scaling is more than a threshold criteria (e.g., a predefined threshold (modTh)).

In an example embodiment, if the termination criteria is met that the level of scaling is greater than the threshold (e.g. 70% virtual resource reduction at a percentage), then the CSP 120 allocates new NSI to the active CSI(s) and the current NSI is terminated at step 414a. For example, if the termination criteria is met that the level of scaling is greater than the threshold, then the CSP 120 may relocate, via the NSMF and the NSSMF, the active/current CSI(s) to the new NSI, i.e., re-allocate the new NSI to the active/current CSI(s), and manage, via the NSMF and the NSSMF, a termination of the current NSI via the resource facing interface of the CSMF, i.e., terminate the current NSI via the resource facing interface of the CSMF. In an example embodiment, the new NSI may be an existing (pre-created) NSI.

In another example embodiment, if the termination criteria is met that the level of scaling is greater than the threshold, then the CSP 120 reserves new NSI for the prospective CSI(s) and the current NSI is terminated at step 414a. In an example embodiment, the new NSI may be an existing (pre-created) NSI.

In another example embodiment, if the termination criteria is not met that the level of scaling is less than the threshold, then the method initiates a modification procedure of the current NSI. The modification procedure of the current NSI is performed based on the level of scaling to be performed. In an example embodiment, the modification procedure may be performed as defined in clause 7.6 of 3GPP TS 28.531.

Figure 4B:
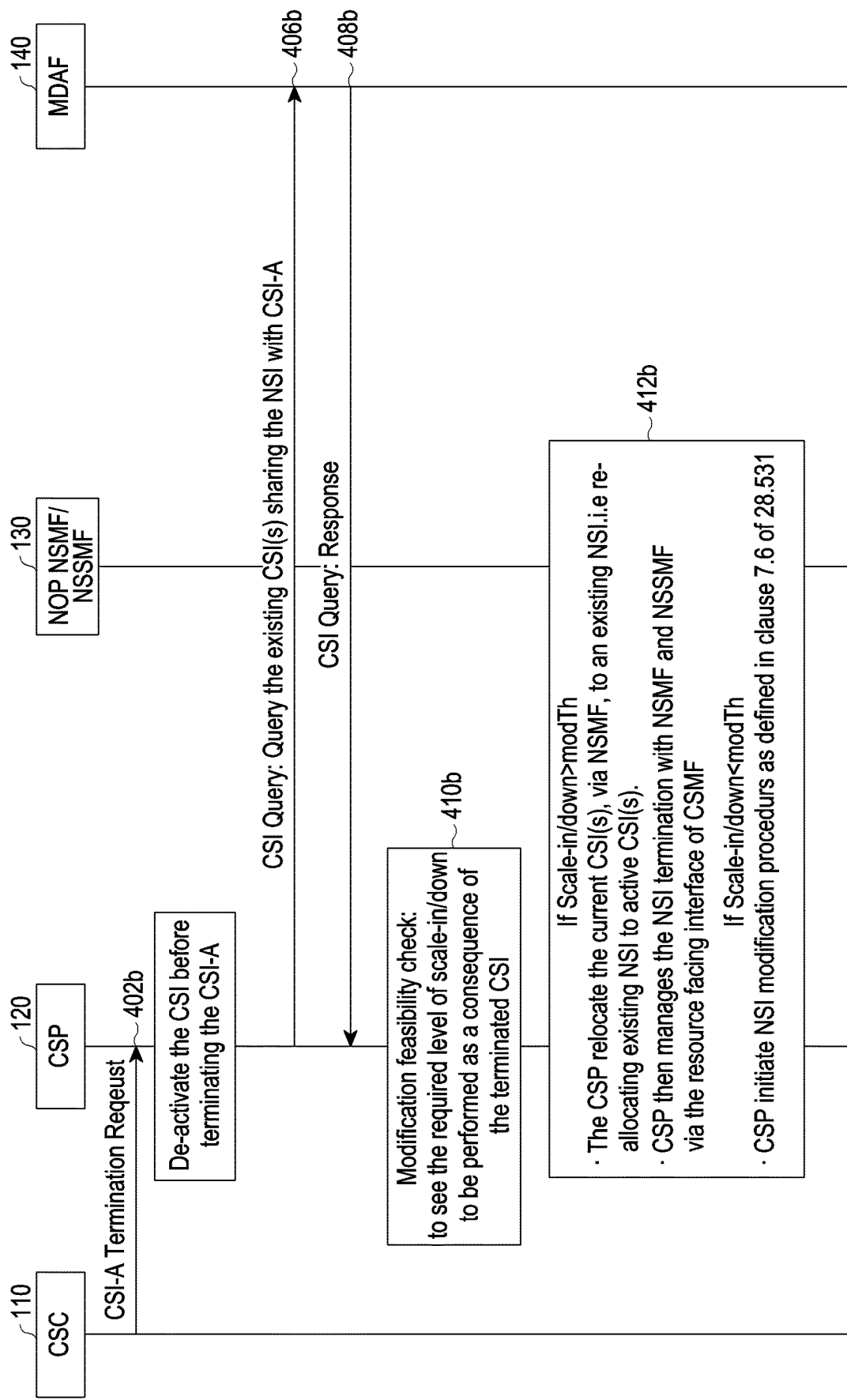
FIG. 4B is a signal flow diagram illustrating example operations for management of NSI, according to an another embodiment of the present disclosure.

FIG. 4b is a sequence diagram illustrating a sequence for management of NSI according to an another example embodiment. As seen in FIG. 4b, the CSC 110, the CSP 120, the management functions NSMF/NSSFM 130 and the analytical functions MDAF 140 (or, NWDAF) communicate with each other for management of the current NSI shared by the terminated CSI and at least one of current/active CSI(s) and prospective CSI(s).

At 402b, the CSC 100 sends a termination request (CSI termination request) to the CSP 120 for terminating a CSI. At 404b, the CSP 120 deactivates and terminates the CSI. At 406b, the CSP 120 sends a query (CSI query) to the at least one analytical function 140 to determine whether there is at least one of the active CSI(s) and the prospective CSI(s) using the current NSI which was used by the terminated CSI (e.g., to determine whether at least one existing CSI shares the current NSI with the terminated CSI). At 408b, the CSP 120 receives a response from the analytical function 140 indicating (including) list of prospective CSI(s) and/or active CSI(s) using the current NSI. In an example embodiment, the analytical function may provide the response to the query based on the availability of active resource reservations against the current NSI, historically alike CSI(s) instantiation records, and the like.

In another example embodiment, at 406b, the CSP 120 sends a query to a CSI inventory present in the communication system 100 asking for information about the current NSI being shared by current CSIs. The inventory sends a response to the CSP 120 indicating (including) the list of current CSIs sharing the current NSI.

At 410b, a model/modification feasibility check is performed. In an example embodiment, the modification feasibility check may include determining a level of scaling to be performed on the current NSI as a result of the terminated CSI and/or the active CSI(s) and the prospective CSI(s) using the current NSI and checking whether a termination criteria is satisfied or not (for example, checking whether the level of scaling exceed the termination criteria (e.g., a predefined threshold (modTh))). In an example embodiment, the model/modification feasibility check may be performed by the CSP 120 via the CSMF and the NSMF.

In an example embodiment, in the modification feasibility check procedure, the CSMF may determine a new set of resource requirements for the current NSI based on the termination of CSI and the requirements of the current/prospective CSI(s). For example, the CSMF may determine a new set of resource requirements for the current NSI based on the requirements of the terminated CSI and the requirements of the current/prospective CSI(s). In the modification feasibility check procedure, the CSMF may deliver the new set of resource requirements to NSMF. In the modification feasibility check procedure, the NSMF may determine a level of a scaling (e.g., scale-in/down) for the current NSI based on the new and existing set of resource requirements. For example, the NSMF may determine a level of a scaling (e.g., scale-in/down) for the current NSI in a cooperation with the NSSMF.

In an example embodiment, if the termination criteria is met that the level of scaling is greater than the threshold (e.g., 70% virtual resource reduction at a percentage), then the CSP 120 allocates new NSI to the active CSI(s), and the current NSI is terminated at step 412b. For example, if the termination criteria is met that the level of scaling is greater than the threshold, the CSP 120 may relocate, via the NSMF and the NSSMF, the active/current CSI(s) to the new NSI, i.e., re-allocate the new NSI to the active/current CSI(s), and manage, via the NSMF and the NSSMF, a termination of the current NSI via the resource facing interface of the CSMF, i.e., terminate the current NSI via the resource facing interface of the CSMF. In an example embodiment, the new NSI may be an existing (pre-created) NSI.

In another example embodiment, if the termination criteria is met that the level of scaling is greater than the threshold, then the CSP 120 reserves a new NSI for the prospective CSI(s), and the current NSI is terminated at step 412b. In an example embodiment, the new NSI may be an existing (pre-created) NSI.

In another example embodiment, if the termination criteria is not met that the level of scaling is less than the threshold, then the method initiates a modification procedure of the current NSI. The modification procedure of the current NSI is performed based on the level of scaling to be performed. In an example embodiment, the modification procedure may be performed as defined in clause 7.6 of 3GPP TS 28.531.

Figure 5:
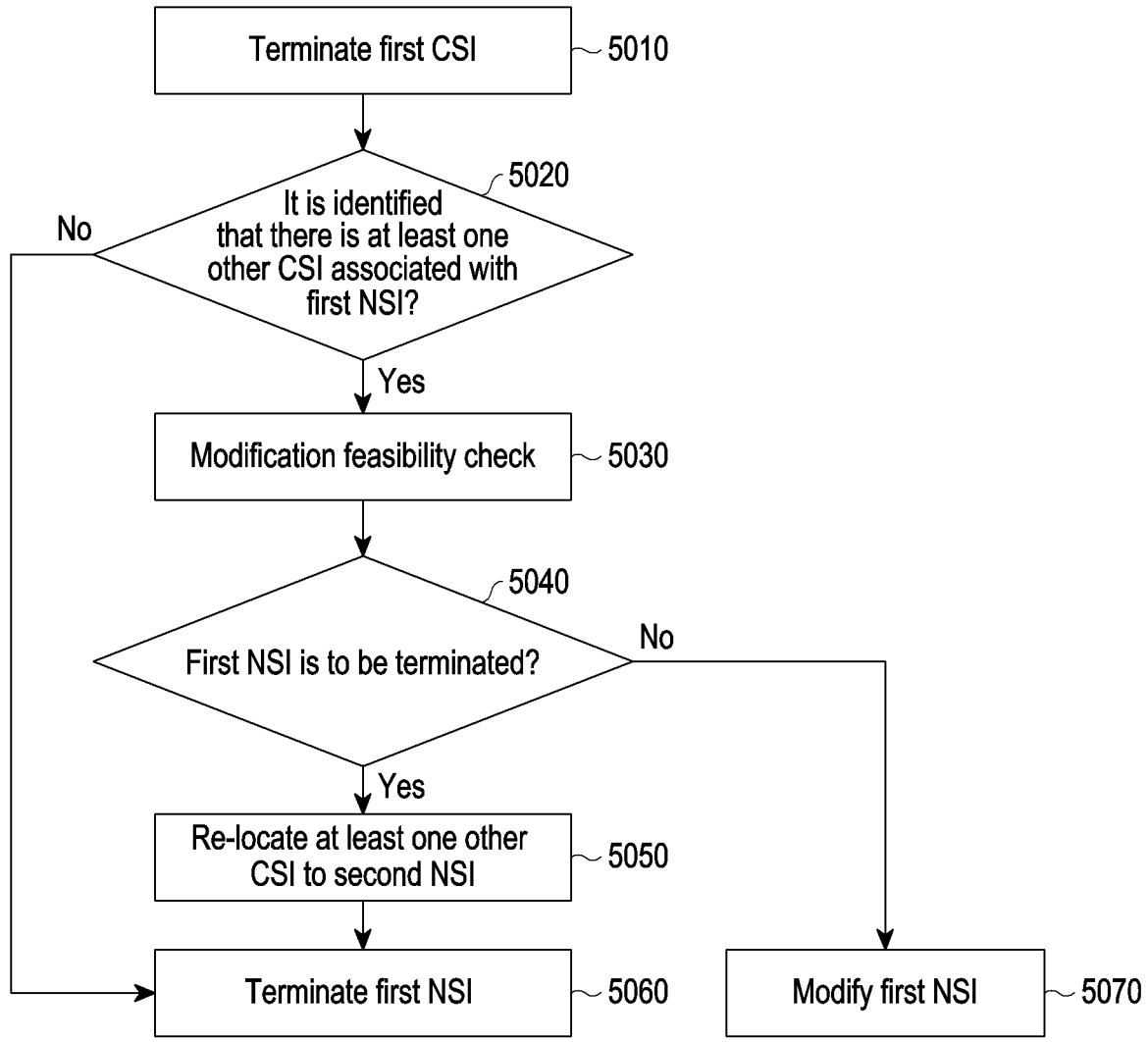
FIG. 5 is a flowchart illustrating an example method of managing NSI, according to an embodiment of the present disclosure.

FIG. 5 illustrates a method of managing NSI according to an example embodiment. More specifically, FIG. 5 illustrates a method in which a first entity for providing or managing a CS (or CSI) manages an NSI associated with the shared CSI in cooperation with a second entity for managing an NS (or, NSI).

Referring to FIG. 5, the first entity may terminate the first CSI based on a termination request for the first CSI (S5010). In an example embodiment, the first CSI may be associated with the first NSI. As described above, if the first CSI is in active state, then the first CSI should be de-activated before the first CSI is terminated. In a present disclosure, the first CSI may be referred to as the terminated CSI and the first NSI may be referred to as the current NSI.

The first entity may identify whether there is at least one other CSI associated with the first NSI (S5020). In an example embodiment, the least one other CSI associated with the first NSI may include at least one of the current/active CSI(s) and the prospective CSI(s). In this case, as described above, for example, information obtained from at least one analytics function (e.g. NWDAF or MDAF) may be used for the identification.

In case that it is identified that there is the at least one other CSI using the first NSI, the first entity may perform a modification feasibility check to check the level of scaling for the first NSI to be performed on the first NSI according to a termination of the first CSI, in cooperation with the second entity (S5030). Here, the scaling is performed as a result of the termination of the first CSI. Or, in case that it is identified that there is no at least one other CSI associated with the first NSI, the first NSI may be terminated (S5060).

In an example embodiment, the modification feasibility check procedure comprises determining, by the first entity, a new set of resource requirements for the first NSI based on the termination of the first CSI and the requirements of the current/prospective CSI(s). For example, the first entity may determine a new set of resource requirements for the first NSI based on the requirements of the terminated first CSI and the requirements of the current/prospective CSI(s).

In addition, the modification feasibility check procedure further comprises delivering, by the first entity, the new set of resource requirements to the second entity.

In addition, the modification feasibility check procedure further comprises determining/identifying (or, checking/seeing), by the second entity, the level of a scaling (e.g., scale-in/down) for the current NSI based on the new and existing set of resource requirements. For example, the second entity may determine the level of a scaling (e.g., scale-in/down) for the first NSI in a cooperation with a third entity.

Based on the modification feasibility check, it may be identified/determined whether to modify or terminate the first NSI (S5040). In an embodiment, based on the modification feasibility check, whether the first NSI is to be terminated or modified is determined/identified. For example, the first entity or the second entity may identify the level of scaling for the first NSI based on the modification feasibility check and determine/identify whether the first NSI is to be terminated or modified by determining whether the level of scaling satisfies/meets the termination criteria.

In an example embodiment, a determination whether to satisfy the termination criteria is performed by comparing the level of the scaling to a predefined threshold. In case that the level of scaling is greater than the predefined threshold (i.e., the level of scaling meets the termination criteria), it is identified/determined that the first NSI is to be terminated. Or, in case that the level of scaling is less than a predefined threshold (i.e. the level of scaling does not meet the termination criteria), it is identified/determined that the first NSI is to be modified. In an example embodiment, the identification/determination may be performed by the first entity. In another example embodiment, the identification/determination may be performed by a second entity. In this case, the first entity may receive the result of the identification//determination by the second entity and perform the following procedure based on the result.

In case that the first NSI is to be terminated, the first entity may initiate relocating of the at least one other CSI to a second NSI (e.g., an existing NSI) (S5050). In other words, a procedure for reallocating the second NSI to the at least one other CSI may be initiated. As described above, in order to relocate the at least one other CSI, the first entity first de-activates the at least one other CSI to detach the first CSI from the first NSI and initiate a CSI activation procedure to allocate the at least one other CSI to a second NSI. Thereafter, the first NSI may be terminated (S5060).

In case that the first NSI is to be modified, the first entity may initiate the NSI modification procedure (S5070).

In the above example embodiment, the first entity may be, for example, a CSP or CSMF (or an entity that performs the CSMF), and the second entity may be, for example, an NSMF (or an entity that performs the NSMF), the third entity may be, for example, an NSSMF (or a network entity that performs the NSSMF). In the above example embodiment, the first entity, second entity and third entity may be referred to a first management apparatus, a second management apparatus, and a third management apparatus, respectively.

Figure 6:
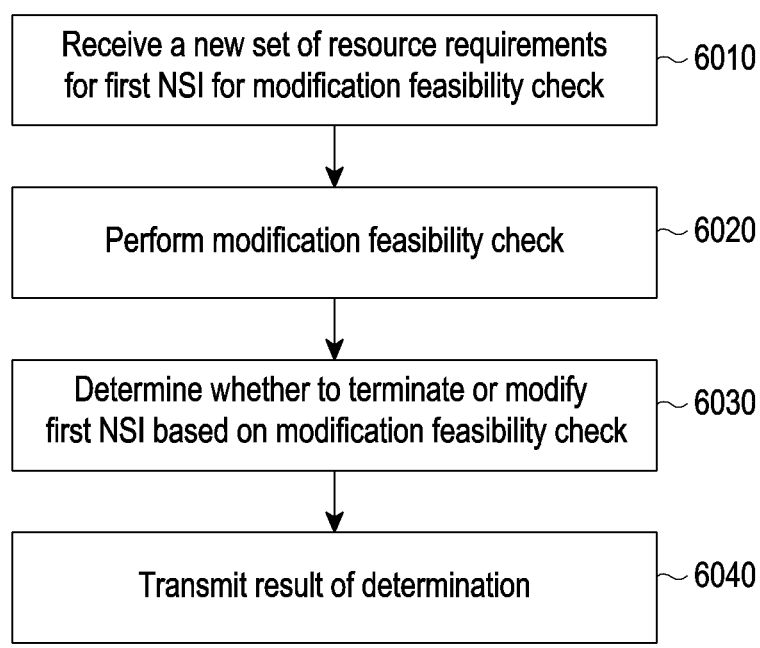
FIG. 6 is a flowchart illustrating an example method of managing NSI, according to an another embodiment of the present disclosure.

FIG. 6 illustrates a method of managing NSI according to an another example embodiment. More specifically, FIG. 6 illustrates a method in which a second entity for managing an NSI manages an NSI associated with the shared CSI in cooperation with a first entity for providing or managing a CS (or CSI).

Referring to FIG. 6, the second entity may receive a new set of resource requirements for a first NSI for a modification feasibility check from the first entity. In an example embodiment, the new set of resource requirements may be included in a request for the modification feasibility check. In an example embodiment, the new set of the resource requirements is configured based on the termination of the first CSI and the requirements of the current/prospective CSI(s). For example, the new set of resource requirements is configured based on the requirements of the terminated first CSI and the requirements of the current/prospective CSI(s). In the present disclosure, the first CSI may be referred to as the terminated CSI and the first NSI may be referred to as the current NSI.

The second entity may perform the modification feasibility check for the first NSI based on the new set of requirements (S6020). In an example embodiment, the second entity may determine a level of a scaling (e.g., scale-in/down) for the first NSI based on the new and existing set of resource requirements. For example, the second entity may determine a level of a scaling (e.g., scale-in/down) for the first NSI in a cooperation with the third entity.

The second entity may identify (or determine) whether to modify or terminate the first NSI based on the modification feasibility check (S6030). In an example embodiment, the second entity may determine whether the level of scaling for the first NSI satisfies/meets the termination criteria in order to identify/determine whether to modify or terminate the first NSI.

The second entity may transmit a result of the identification/determination for modification or termination of the first NSI to the first entity. In an example embodiment, the result of the identification/determination may be transmitted as a response for the modification feasibility check (S6040). Based on the result, the first entity may initiate the above mentioned procedure for the modification or termination of the first NSI.

In the above example embodiment, the first entity may be, for example, a CSP or CSMF (or a network entity that performs the CSMF), and the second entity may be, for example, an NSMF (or a network entity that performs the NSMF), the third entity may be, for example, an NSSMF (or a network entity that performs the NSSMF). In the above example embodiment, the first entity, second entity, and third entity may be referred to as a first management apparatus, a second management apparatus, and a third management apparatus, respectively.

Figure 7:
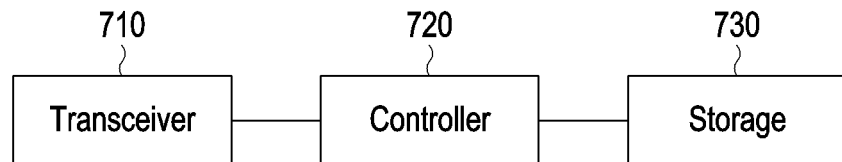
FIG. 7 is a block diagram illustrating an example CSC according to an embodiment of the disclosure.

FIG. 7 illustrates a CSC according to an example embodiment. The CSC may include a transceiver 710, a controller 720, and a storage 730. In the disclosure, the controller 720 may be defined as a circuit, an application-specific integrated circuit, or at least one processor. In the disclosure, transceiver 710 may be defined as at least one communicator, and a storage 730 may be defined as at least one memory.

The memory may store instructions to be executed by the one or more processors. The memory may include non-volatile storage elements. Examples of such non-volatile storage elements may include magnetic hard discs, optical discs, floppy discs, flash memories, or forms of erasable programmable memories (EPROM) or electrically erasable and programmable read only memories (EEPROM). In addition, the memory may, in some examples, be considered a non-transitory storage medium. The term "non-transitory" may indicate that the storage medium is not embodied in a carrier wave or a propagated signal. However, the term "non-transitory" should not be interpreted that the memory is non-movable. In some examples, the memory can be configured to store larger amounts of information than the memory. In certain examples, a non-transitory storage medium may store data that can, over time, change (e.g., in Random Access Memory (RAM) or cache).

The transceiver 710 may transmit/receive a signal to/from another network entity. The transceiver 710 may be configured for communicating internally between internal hardware components and with external devices via one or more networks. For example, the transceiver 710 may receive information for the CSI from the CSP.

The controller 720 may control the overall operation of the CSC according to an embodiment. The controller 720 may be configured to execute instructions stored in the memory and to perform various processes. For example, the controller 720 may control signal flows to perform the operations according to the procedures described above in relation to FIGS. 1 to 6.

The storage 730 may store at least one piece of information transmitted and received through the transceiver 710 and information generated through the controller 720. For example, the storage 730 may store the information for the CSI from the CSP.

Figure 8:
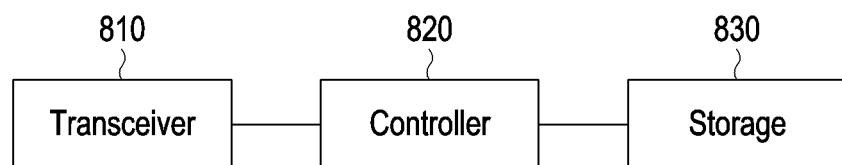
FIG. 8 is a block diagram illustrating an example CSP according to an embodiment of the disclosure.

FIG. 8 illustrates CSP according to an example embodiment. The CSP may include a transceiver 810, a controller 820, and a storage 830. In the disclosure, the controller 820 may be defined as a circuit, an application-specific integrated circuit, or at least one processor. In the disclosure, transceiver 810 may be defined as at least one communicator and a storage 830 may be defined as at least one memory.

The memory may store instructions to be executed by the one or more processors. The memory may include non-volatile storage elements. Examples of such non-volatile storage elements may include magnetic hard discs, optical discs, floppy discs, flash memories, or forms of erasable programmable memories (EPROM) or electrically erasable and programmable read only memories (EEPROM). In addition, the memory may, in some examples, be considered a non-transitory storage medium. The term "non-transitory" may indicate that the storage medium is not embodied in a carrier wave or a propagated signal. However, the term "non-transitory" should not be interpreted that the memory is non-movable. In some examples, the memory can be configured to store larger amounts of information than the memory. In certain examples, a non-transitory storage medium may store data that can, over time, change (e.g., in Random Access Memory (RAM) or cache).

The transceiver 810 may transmit/receive a signal to/from another network entity. The transceiver 810 may be configured for communicating internally between internal hardware components and with external devices via one or more networks. For example, the transceiver 810 may receive request for termination of the CSI from the CSC.

The controller 820 may control the overall operation of the CSP according to an example embodiment. The controller 820 may be configured to execute instructions stored in the memory and to perform various processes. For example, the controller 820 may control signal flows to perform the operations described above in relation to FIGS. 1 to 6.

The storage 830 may store at least one piece of information transmitted and received through the transceiver 810 and information generated through the controller 820. For example, the storage 830 may store the information for the generated CSI.

Figure 9:
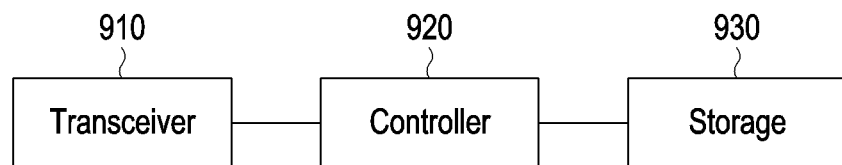
FIG. 9 is a block diagram illustrating an example management entity according to an embodiment of the disclosure.

FIG. 9 illustrates management entity according to an example embodiment, where the management entity may be one of a CSMF (or an entity performing CSMF), an NSMF (or an entity performing NSMF) or an NSSMF (or an entity performing NS SMF).

As described above in relation to embodiment, the management entity may include a transceiver 910, a controller 920, and a storage 930. In the disclosure, the controller 920 may be defined as a circuit, an application-specific integrated circuit, or at least one processor. In the disclosure, transceiver 910 may be defined as at least one communicator and a storage 930 may be defined as at least one memory.

The memory may stores instructions to be executed by the one or more processors. The memory may include non-volatile storage elements. Examples of such non-volatile storage elements may include magnetic hard discs, optical discs, floppy discs, flash memories, or forms of erasable programmable memories (EPROM) or electrically erasable and programmable read only memories (EEPROM). In addition, the memory may, in some examples, be considered a non-transitory storage medium. The term "non-transitory" may indicate that the storage medium is not embodied in a carrier wave or a propagated signal. However, the term "non-transitory" should not be interpreted that the memory is non-movable. In some examples, the memory can be configured to store larger amounts of information than the memory. In certain examples, a non-transitory storage medium may store data that can, over time, change (e.g., in Random Access Memory (RAM) or cache).

The transceiver 910 may transmit/receive a signal to/from another network entity. The transceiver 910 may be configured for communicating internally between internal hardware components and with external devices via one or more networks. For example, the transceiver 910 may receive/transmit request/response for a modification feasibility check.

The controller 920 may control the overall operation of the CSP as described above in relation to embodiment. The controller 920 may be configured to execute instructions stored in the memory and to perform various processes. For example, the controller 920 may control signal flows to perform operations described above in relation to FIGS. 1 to 6.

The storage 930 may store at least one piece of information transmitted and received through the transceiver 910 and information generated through the controller 920. For example, the storage 930 may store the information for a modification feasibility check.

In accordance with an aspect of the present disclosure, apparatus for use in a communication system is provided. The apparatus comprises processing circuitry configured to: terminate a first communication service instance (CSI) based on a termination request for the first CSI, the first CSI being associated with a first network slice instance (NSI); identify whether there is at least one other CSI associated with the first NSI; in case that it is identified that there is the at least one other CSI associated with the first NSI, perform a modification feasibility check for the first NSI to determine a level of scaling to be performed on the first NSI according to a termination of the first CSI; in case that the first NSI is to be terminated, initiate re-allocation of the at least one other CSI to a second NSI.

In an example embodiment, processing circuitry configured to initiate modification of the first NSI in case that the first NSI is to be modified.

In an example embodiment, the level of scaling is used to determine whether the first NSI is to be terminated or to be modified.

In an example embodiment, it is determined that the first NSI is to be terminated, in case that the level of scaling satisfies a termination criteria, or it is determined that the first NSI is to be modified, in case that the level of scaling does not satisfy a termination criteria.

In an example embodiment, a determination whether to satisfy the termination criteria is performed by comparing the level of the scaling to a predefined threshold.

In an example embodiment, the at least one other CSI associated with the first NSI includes at least one of one or more active CSIs using the first NSI and one or more prospective CSIs that will use the first NSI.

In an example embodiment, the processing circuitry is configured to, in case that it is identified that the level of scaling does not satisfy the termination criteria, initiate a modification procedure for the first NSI.

In an example embodiment, the processing circuitry is configured to: identify a status of the first CSI before the first CSI is terminated, and in case that the first CSI is in an active state, de-activate the first CSI.

In an example embodiment, the second NSI is a pre-created NSI, different from the first NSI.

In an example embodiment, the processing circuitry is configured to identify whether there is at least one other CSI associated with the first NSI based on information received from an entity performing management data analytics function (MDAF) or network data analytics function (NWDAF).

In an example embodiment, the performing the modification feasibility check comprises configuring a new set of resource related requirements for the first NSI based on a requirements of the at least one other CSI.

In an example embodiment, the processing circuitry is configured to deactivate the at least one other CSI to detach the at least one other CSI from the first NSI before the at least one other CSI is re-allocated to the second NSI.

In an example embodiment, the processing circuitry is configured to terminate the first NSI after the at least one other CSI is re-allocated to the second NSI.

In an example embodiment, the determination is performed based on comparing the level of the scaling to a predefined threshold.

In an example embodiment, after deactivation of the at least one other CSI and detachment of the at least one other CSI from the first NSI, the processing circuitry is configured to initiate activation procedure for the at least one other CSI as part of re-allocating the at least one other CSI to the second NSI.

In an example embodiment, the processing circuitry is configured to terminate the first NSI in case that the at least one other CSI is re-allocated to the second NSI.

In an example embodiment, the processing circuitry is configured to perform a communication service management function (CSMF).

In accordance with another aspect of the present disclosure, a method for network management in a core network of a telecommunications system is provided. The method comprises receiving a request requesting termination of a first communication service instance (CSI) using a first network slice instance (NSI); terminating the first CSI; performing a feasibility check for modification of the first NSI based on identifying that there is at least one other CSI using the first NSI along with the first CSI; and initiating re-allocation of the at least one other CSI to a second NSI based on the feasibility check.

In an example embodiment, the method further comprises identifying a status of the first CSI, and in case that the first CSI is in an active state, de-activating the first CSI.

In an example embodiment, the second NSI is a pre-created NSI, different from the first NSI.

In an example embodiment, the method further comprises identifying whether there is the at least one other CSI using the first NSI along with the first CSI.

In an example embodiment, the method further comprises identifying whether the at least one other CSI is using the first NSI along with the first CSI based on information received from an entity performing management data analytics function (MDAF) or network data analytics function (NWDAF).

In an example embodiment, the feasibility check is performed to check a required level of scale-in or scale-down for the first NSI.

In an example embodiment, in case that a determination to modify the first NSI is identified, the method further comprises initiating one or more NSI modification procedures for the first NSI.

In an example embodiment, in case that a determination to terminate the first NSI is identified, the method further comprises deactivating the at least one other CSI to detach the at least one other CSI from the first NSI before the at least one other CSI is re-allocated to the second NSI.

In an example embodiment, the determination is based on comparing the required level to a predetermined threshold.

In an example embodiment, the re-allocating the at least one other CSI to the second NSI comprises initiating activation procedures for the at least one other CSI after deactivation of the at least one other CSI and detachment of the at least one other CSI from the first NSI.

In an example embodiment, the method further comprises terminating the first NSI in case that the at least one other CSI is re-allocated to the second NSI.

The example embodiments disclosed herein can be implemented using at least one software program running on at least one hardware device and performing network management functions to control the elements.

The foregoing description of the specific embodiments will so fully reveal the general nature of the example embodiments herein that others can, by applying current knowledge, readily modify and/or adapt for various applications such specific example embodiments without departing from the generic concept, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described in terms of preferred embodiments, those skilled in the art will recognize that the example embodiments herein can be practiced with modification within the spirit and scope of the example embodiments as described herein.

What is claimed is:

1. Network management apparatus for use in a telecommunications system, comprising:
    processing circuitry configured to:
        receive a request signal requesting termination of a first communication service instance (CSI) supported by a first network slice instance (NSI) associated with a first set of network resource requirements;
        when at least one other CSI is currently supported by the first NSI along with the first CSI, determine a scaled-down set of network resource requirements associated with the first NSI when the first CSI is terminated;
        perform an analysis of the scaled-down set of network resource requirements;
        based on the analysis, determine whether the first NSI should be terminated; and
        when the first NSI is to be terminated, initiate re-allocation of the at least one other CSI to a second existing NSI different from the first NSI.

2. The network management apparatus in claim 1, wherein the processing circuitry is configured to determine a status of the first CSI, and if the first CSI is in an active state, de-activate the first CSI.

3. The network management apparatus in claim 2, wherein the processing circuitry is configured to terminate the de-activated first CSI.

4. The network management apparatus in claim 1, wherein the processing circuitry is configured to determine whether at least one other CSI is currently supported by the first NSI.

5. The network management apparatus in claim 4, wherein the processing circuitry is configured to determine whether at least one other CSI is currently supported by the first NSI based on information received from management data analytics functionality (MDAF).

6. The network management apparatus in claim 5, wherein the processing circuitry is configured to perform an NSI modification feasibility analysis, and based on the NSI modification feasibility analysis, determine the scaled-down set of network resource requirements associated with the first NSI when the first CSI is terminated.

7. The network management apparatus in claim 1, wherein the processing circuitry is configured to perform the analysis of the scaled-down set of network resource requirements by comparing the scaled-down set of network resource requirements to a predetermined threshold, and based on the comparing, determine whether to modify the NSI or to terminate the first NSI.

8. The network management apparatus in claim 7, wherein when the first NSI is to be modified, the processing circuitry is configured to initiate one or more NSI modification procedures for the first NSI.

9. The network management apparatus in claim 1, wherein when the first NSI is to be terminated, the processing circuitry is configured to deactivate the at least one other CSI to detach the at least one other CSI from the first NSI before the at least one other CSI is re-allocated to the second existing NSI.

10. The network management apparatus in claim 9, wherein after deactivation of the at least one other CSI and detachment of the at least one other CSI from the first NSI, the processing circuitry is configured to initiate activation procedures for the at least one other CSI as part of re-allocating the at least one other CSI to the second existing NSI.

11. The network management apparatus in claim 10, wherein the processing circuitry is configured to terminate the first NSI when the at least one other CSI is re-allocated to the second existing NSI.

12. The network management apparatus in claim 1, wherein the processing circuitry is configured to perform a communication service management function (CSMF).

13. The network management apparatus in claim 1, wherein the processing circuitry is configured to perform one or more of a communication service management function (CSMF), a network slice management function (NMSF), or a network slice subnet management function (NMSSF) to reconfigure network resources to reduce resource consumption.

14. A method for network management in a core network of a telecommunications system, the method comprising:
    receiving a request signal requesting termination of a first communication service instance (CSI) supported by a first network slice instance (NSI) associated with a first set of network resource requirements;
    when at least one other CSI is currently supported by the first NSI along with the first CSI, determining a scaled-down set of network resource requirements associated with the first NSI when the first CSI is terminated;
    performing an analysis of the scaled-down set of network resource requirements;
    based on the analysis, determining whether the first NSI should be terminated; and
    when the first NSI is to be terminated, initiating re-allocation of the at least one other CSI to a second existing NSI different from the first NSI.

15. The method in claim 14, further comprising determining a status of the first CSI, and if the first CSI is in an active state, de-activate the first CSI, and comprising terminating the de-activated first CSI.

16. The method in claim 14, further comprising determining whether at least one other CSI is currently supported by the first NSI based on information received from management data analytics functionality (MDAF), and
    comprising performing an NSI modification feasibility analysis, and based on the NSI modification feasibility analysis, determining the scaled-down set of network resource requirements associated with the first NSI when the first CSI is terminated.

17. The method in claim 14, further comprising performing the analysis of the scaled-down set of network resource requirements by comparing the scaled-down set of network resource requirements to a predetermined threshold, and based on the comparing, determine whether to modify the NSI or to terminate the first NSI, and wherein when the first NSI is to be modified, the method further comprises initiating one or more NSI modification procedures for the first NSI.

18. The method in claim 14, wherein when the first NSI is to be terminated, the method further comprises deactivating the at least one other CSI to detach the at least one other CSI from the first NSI before the at least one other CSI is re-allocated to the second existing NSI, and wherein after deactivation of the at least one other CSI and detachment of the at least one other CSI from the first NSI, the method further comprises initiating activation procedures for the at least one other CSI as part of re-allocating the at least one other CSI to the second existing NSI, and further comprising terminating the first NSI when the at least one other CSI is re-allocated to the second existing NSI to reconfigure network resources to reduce resource consumption.

19. A non-transitory, computer-readable storage medium having computer-readable instructions stored thereon, the computer-readable instructions are configured to, when executed, instruct one or more processors to:

receive a request signal requesting termination of a first communication service instance (CSI) supported by a first network slice instance (NSI) associated with a first set of network resource requirements;

when at least one other CSI is currently supported by the first NSI along with the first CSI, determine a scaled-down set of network resource requirements associated with the first NSI when the first CSI is terminated;

perform an analysis of the scaled-down set of network resource requirements;

based on the analysis, determine whether the first NSI should be terminated; and when the first NSI is to be terminated, initiate re-allocation of the at least one other CSI to a second existing NSI different from the first NSI.

20. The non-transitory, computer-readable storage medium in claim 19, wherein the computer-readable instructions, when executed, instruct one or more processors to determine a status of the first CSI, and if the first CSI is in an active state, de-activate the first CSI, and when executed, instruct one or more processors to terminate the de-activated first CSI.

* * * * *